US012491652B2

(12) United States Patent
Seidel et al.

(10) Patent No.: US 12,491,652 B2
(45) Date of Patent: Dec. 9, 2025

(54) METHOD FOR CORRECTING AN ALIGNMENT OF A CUTTING LAYER AND CUTTING MACHINE

(71) Applicant: POLAR-Mohr Beteiligungs GmbH, Hofheim am Taunus (DE)

(72) Inventors: Frank Seidel, Dreieich (DE); Markus Judel, Hofheim am Taunus (DE)

(73) Assignee: POLAR-Mohr Beteiligungs GmbH, Hofheim am Taunus (DE)

( * ) Notice: Subject to any disclaimer, the term of this patent is extended or adjusted under 35 U.S.C. 154(b) by 158 days.

(21) Appl. No.: 18/440,689

(22) Filed: Feb. 13, 2024

(65) Prior Publication Data

US 2024/0269878 A1 Aug. 15, 2024

(30) Foreign Application Priority Data

Feb. 13, 2023 (EP) .................................... 23156396

(51) Int. Cl.

| | |
|---|---|
| ***B26D 5/40*** | (2006.01) |
| ***B26D 1/08*** | (2006.01) |
| ***B26D 5/00*** | (2006.01) |
| ***B26D 7/01*** | (2006.01) |

(52) U.S. Cl.

CPC ............... *B26D 5/40* (2013.01); *B26D 5/007* (2013.01); *B26D 7/015* (2013.01); *B26D 1/08* (2013.01)

(58) Field of Classification Search

CPC .................................. B26D 5/40; B26D 5/007

See application file for complete search history.

(56) References Cited

U.S. PATENT DOCUMENTS

| | | | | | |
|---|---|---|---|---|---|
| 4,255,994 | A * | 3/1981 | Strunc | G03D 15/046 | 83/79 |
| 5,072,640 | A * | 12/1991 | Greve | B23D 33/006 | 83/369 |
| 5,429,024 | A * | 7/1995 | Shimizu | B26D 5/38 | 83/268 |
| 5,586,479 | A * | 12/1996 | Roy | B26D 7/015 | 346/24 |
| 5,791,215 | A * | 8/1998 | Morrison | D06H 7/16 | 83/13 |
| 6,065,383 | A * | 5/2000 | Takaishi | B26D 7/2628 | 83/370 |

(Continued)

FOREIGN PATENT DOCUMENTS

| | | | |
|---|---|---|---|
| DE | 102017112754 | A1 | 12/2018 |
| EP | 2656984 | B1 | 2/2015 |

(Continued)

*Primary Examiner* — Sean M Michalski

(74) *Attorney, Agent, or Firm* — NK Patent Law

(57) ABSTRACT

A method for correcting an alignment of a cutting layer made up of stacked, sheet-format product in the form of sheets in relation to a cutting plane of a cutting blade of a cutting machine, and a cutting machine. The cutting machine has a feed saddle for displacing the cutting layer in the direction of the cutting plane of the cutting blade, wherein the feed saddle is adjustable in its alignment in relation to the cutting plane to change the alignment of the cutting layer pressing against the feed saddle in relation to the cutting plane. The respective sheet is provided with at least one cutting test mark, wherein the respective cutting test mark has a coloration changing in the feed direction of the feed saddle.

15 Claims, 6 Drawing Sheets

(56) References Cited

U.S. PATENT DOCUMENTS

| | | | | |
|---|---|---|---|---|
| 6,112,658 | A * | 9/2000 | Gunther | B41F 33/0009 101/171 |
| 10,052,778 | B2 * | 8/2018 | Scherhag | B26D 5/40 |
| 10,961,076 | B2 * | 3/2021 | Gordon | B65H 35/008 |
| 11,944,105 | B1 * | 4/2024 | Foreman | B25J 13/08 |
| 12,193,450 | B1 * | 1/2025 | Foreman | G06T 7/13 |
| 2011/0132163 | A1 * | 6/2011 | Deutsch | B26F 3/02 83/78 |
| 2012/0204689 | A1 * | 8/2012 | Shimakawa | B26D 5/40 83/62 |
| 2015/0122098 | A1 * | 5/2015 | Scherhag | B26D 5/00 83/367 |
| 2018/0029246 | A1 * | 2/2018 | Blaine | B26F 3/004 |
| 2019/0152736 | A1 * | 5/2019 | Gordon | B26D 5/007 |
| 2022/0111675 | A1 * | 4/2022 | Fukushima | B42C 99/00 |

FOREIGN PATENT DOCUMENTS

| | | | |
|---|---|---|---|
| EP | 4056336 | A1 | 9/2022 |
| WO | 2013159885 | A1 | 10/2013 |

* cited by examiner

METHOD FOR CORRECTING AN ALIGNMENT OF A CUTTING LAYER AND CUTTING MACHINE

FIELD OF THE INVENTION

The invention relates to a method for correcting an alignment of a cutting layer made up of stacked, sheet-format product in the form of sheets in relation to a cutting plane of a cutting blade of a cutting machine, in particular a cutting machine which is designed as a guillotine cutting machine and/or as a high-speed cutting machine. Furthermore, the invention relates to a cutting machine, in particular a cutting machine which is designed as a guillotine cutting machine and/or as a high-speed cutting machine.

BACKGROUND OF THE INVENTION AND RELATED ART

A cutting machine is known, for example, from EP 2 656 984 B1. The cutting machine described in EP 2 656 984 B1 is designed as a guillotine cutting machine. It has a base frame, which accommodates a table, furthermore a portal frame mounted in the base frame, in which the cutting blade is mounted. Before the cut, the cutting layer made up of sheet-format stacked product resting on the table is pressed against the surface of the table facing toward the stack by means of a pressing bar and the cut is then carried out by means of the cutting blade. To bring the cutting layer into the area of a cutting plane of the cutting blade of the cutting machine, the cutting machine has a feed saddle, wherein this feed saddle is rotatable around a vertical axis and tiltable around a horizontal axis for the alignment of the cutting layer or a printed image printed on the sheet in relation to the cutting plane of the cutting blade. Furthermore, the cutting machine has means for rotating and tilting the feed saddle. Since the cutting layer presses against the feed saddle, the alignment of the cutting layer in relation to the cutting plane can be changed by rotating and tilting the feed saddle and thus any deviations of the alignment from an intended alignment can be corrected. By changing the tilt, deviations in the location of the cut over the height of the stack, therefore an undercut or overcut, can be corrected. Deviations in the location of the cut over the transverse extension of the stack can be corrected by changing the rotational position. Such a rotational correction or tilt correction of the feed saddle is presently often carried out via a visual qualitative assessment of the cutting picture of cut markings by the machine operator and corresponding manual corrections of the rotational position or tilt position of the feed saddle carried out by the machine operator. This correction of the rotational position or tilt position of the feed saddle carried out by the machine operator has the disadvantage that the assessment of the cutting picture and the changes of the rotational position and/or tilt position of the feed saddle to be derived therefrom and performed are relatively time-consuming and experiential values of the machine operator using the corresponding cutting machine are necessary in order to be able to perform a reliable correction of the alignment of the feed saddle. Furthermore, a correction method carried out by a machine operator is always subject to error and errors can occur due to incorrect operation. Automation of the correction method is moreover a condition for automating the complete cutting process.

A method for cutting strip-shaped panels by means of a cutting machine, which has an adjustable feed saddle, is described in DE 10 2017 112 754 A1. Markings are applied here to the sheets, wherein the cutting layer is cut through in the area of the markings, due to which the markings become visible on the front side. A distance of these markings to a reference is then measured on the front side, wherein the feed saddle is adjusted in the event of a deviation of this distance from a reference value. This method has the problem that such a distance measurement is complex and susceptible to error.

OBJECTS AND SUMMARY OF THE INVENTION

The object of the present invention is to specify a method and a cutting machine in which any deviations in the alignment of the cutting layer to the cutting plane of the cutting blade can be determined particularly reliably and required corrections can be performed.

These objects are achieved by a method which has the features of the method disclosed herein and by a cutting machine which has the features of the cutting machine disclosed herein.

The method is used for correcting an alignment of a cutting layer made up of stacked, sheet-format product in the form of sheets in relation to a cutting plane of a cutting blade of a cutting machine. The cutting machine has a table for receiving the cutting layer and a feed saddle for displacing the cutting layer in the direction of the cutting plane of the cutting blade of the cutting machine. The feed saddle is adjustable in its alignment in relation to the cutting plane to change the alignment of the cutting layer pressing against the feed saddle in relation to the cutting plane. A respective sheet is provided with at least one cutting test mark, wherein the respective cutting test mark has a coloration changing in the feed direction of the feed saddle. The method comprises the following method steps:

a) displacing the cutting layer by means of the feed saddle in the direction of the cutting plane of the cutting blade such that the cutting plane intersects the cutting test marks;
b) cutting the cutting layer using the cutting blade to form a cut front side having a frontally visible colored pattern formed by the cut-through cutting test marks;
c) determining a coloration of the frontally visible pattern; and
d) determining whether deviations of the alignment of the cutting layer from an intended alignment are present, wherein the determination is carried out on the basis of the coloration of the frontally visible pattern, wherein if deviations are present, the alignment of the feed saddle in relation to the cutting plane is changed to correct the alignment of the cutting layer.

On the basis of the colored pattern, which is formed on the front side by the cutting test marks, deviations of the alignment of the cutting layer with respect to the cutting plane can be determined in a simple manner, since the coloration of the pattern formed is determined by the course of the cut through the cutting layer and thus through the cutting test marks. The course of the cut is in turn determined by the alignment of the cutting layer in relation to the cutting plane. Depending on the deviation of the alignment of the cutting layer from the desired intended alignment of the cutting layer, the coloration of the pattern formed by the cut-through cutting test marks has characteristic features. For example, the coloration has a change in the vertical direction or stack direction of the cutting layer in the event of a deviation of the alignment in the form of a tilt error. A coloration of the pattern in the stack direction of the stack changing in the stack direction thus indicates an undercut or an overcut. The term "overcut" is understood in the present case in particular as a cutting error in which the top sheet in the cutting layer is dimensionally accurate and the lower sheets after the cut are excessively long. If the lower sheets in the cutting layer are excessively short, the cutting error is accordingly referred to as an "undercut". In contrast, if the coloration is homogeneous or monochromatic over the entire height of the cutting layer, the cutting test marks are each cut through at the same position in the feed direction, due to which the monochromatic pattern results. It can therefore be concluded in the event of a coloration which does not have a change in the stack direction that no tilt error of the cutting layer in relation to the cutting plane is present. This applies accordingly to a deviation in the rotational position of the cutting layer in relation to the cutting plane.

Complex and error-prone distance measurements are thus not necessary in principle, in order to determine possible deviations of the alignment from the intended alignment. A coloration can be determined and evaluated quickly and reliably, for example, by means of a computer-assisted image processing program, by which a high degree of automation can be achieved. Complex calibrations for the purpose of exact distance measurement are not necessary. Tolerances of a possible image sensor which is used to detect the pattern are also not problematic for the determination of whether deviations are present, since the evaluation is carried out on the basis of the deviation in the coloration. Furthermore, perspective distortions do not have a negative effect or are at least of secondary importance.

With respect to the intended alignment of the stack, it is also to be noted in this context that the intended alignment of the stack can also in particular relate to a printed image of the respective sheet applied to the respective sheet. If the printed image on the respective sheet is not aligned exactly on the sheet, for example, is aligned toward an uncut front edge, this inexact alignment of the printed image on the sheet can be compensated for by a corresponding alignment of the cutting layer in relation to the cutting plane.

At least method steps b), c), and d) preferably take place in an automated manner. Method steps b), c), and d) preferably take place in a computer-assisted manner.

It is considered to be particularly advantageous if method steps a) to d) are carried out again at least once after method step d). A check of the corrections performed is thus carried out and any overcorrections can be corrected in turn.

The at least one cutting test mark is preferably printed on the respective sheet. It is considered to be particularly advantageous here if the at least one cutting test mark is printed together with a printed image to be exposed by corresponding cutting using the cutting machine on the respective sheet. The alignment of the cutting test mark on the sheet is thus identical to the alignment of the printed image.

The frontally visible pattern of the cut cutting layer pressing against the feed saddle is preferably used. In this context, it is considered to be advantageous if the cutting machine has a pressing bar, which presses the cutting layer against the table during cutting, wherein the coloration of the pattern is determined in a state of the cutting layer in which the pressing bar is pressed against the cutting layer. For this purpose, it is entirely conceivable that in the pressed-on state, the frontal pattern is acquired using an image sensor, for example, an image sensor of a camera, and the coloration of the pattern is determined on the basis of the image acquired by the image sensor.

The cutting test marks preferably have a cross section changing in the feed direction of the feed saddle. In addition to the determination of the alignment on the basis of the coloration, a determination can thus additionally be carried out on the basis of a geometry of the pattern.

In one preferred embodiment, the feed saddle is rotatable around a first axis extending perpendicular to a plane spanned by the table to change a rotational angle of the feed saddle with respect to the cutting plane.

It is considered to be particularly advantageous if the feed saddle is rotatable around a second axis extending parallel to the plane spanned by the table to change a tilt angle of the feed saddle with respect to the cutting plane.

The respective cutting test mark preferably has at least two monochromatic sections arranged one behind the other in a feed direction of the feed saddle, wherein adjacent sections in the feed direction differ in their color. It is considered to be particularly advantageous if the respective cutting test mark has at least three colored sections in three different colors. Preferably, the first section of the three sections is blue or black, a second section of the three sections is yellow, and a third section of the three sections is red. A good contrast effect is thus achieved between the sections, by which the determination of deviations is facilitated, since then a high contrast effect in the coloration of the pattern is also present upon any deviation of the alignment.

The sections are preferably formed rectangular, in particular strip-shaped.

The sections preferably each have an extension of at least 0.05 mm, preferably of 0.05 mm to 2 mm, preferably of 0.05 mm to 0.5 mm in the feed direction of the feed saddle. In a particularly preferred embodiment, the sections each have an extension of 0.05 mm to 0.2 mm in the feed direction of the feed saddle. These dimensions have proven to be advantageous with respect to a still tolerable deviation from the intended alignment. Moreover, tolerances in the alignment of the printed image on the respective sheet and/or tolerances in the alignment of the individual sheets of the cutting layer can be equalized by this extension, which would otherwise make evaluating the coloration of the pattern more difficult.

It is considered to be particularly advantageous if the cutting layer is displaced in the cutting plane such that the cutting plane intersects one of the sections in the middle with respect to the uppermost sheet. In such a case, the pattern has a coloration changing in the stack direction if the deviation of the cutting position between the uppermost sheet and the lowermost sheet is greater than half the extension of this section.

The use of sections of different colors is also advantageous in that a required correction of the tilt angle can be carried out by simply counting the areas of different color in the pattern. Since the distance of the centers of the individual sections in relation to one another and/or the extension of the individual sections is known, with known stack height, the required angle correction to achieve a cut perpendicular to the cutting layer can be determined via the geometric relationship of these variables, in particular calculated, for example in good approximation via the formula $$\varphi = \arctan\frac{(N-1)\times A}{H}$$

wherein

φ: required tilt angle correction or angle deviation in the tilt;

N: number of the areas of different color in the pattern in the stack direction;

A: distance between the centers of adjacent sections in the cutting test mark in the feed direction; and H: stack height of the cutting layer.

When three different colors are recognized, it can be concluded from the relationship of the structure of the test pattern, for example, if the sections each have an extension of 0.05 mm in the feed direction and directly adjoin one another in the feed direction, that a deviation of at least 2×0.05 mm over the cut height is present—without the distance of the reference positions having to be "measured" optically in a complex manner via a pixel evaluation.

The determination or calculation of the required angle correction via the number of the areas of different color is subject to a certain uncertainty or a margin of error due to the extension of the colored sections. However, it has been shown that after the corresponding angle correction, a sufficiently good alignment of the cutting layer is achieved in spite of the margin of error. Therefore, by simply counting the areas of different color and thus particularly quickly and with little effort, a required angle correction can be determined or calculated with sufficient quality.

With respect to an embodiment having sections, it is considered to be advantageous if the cutting test mark has four or more sections in order to increase the accuracy.

Via the sequence of the colored areas in the stack direction, it can be judged by a comparison to the sequence of the colored sections in the cutting test mark whether an undercut or an overcut is present and thus in which direction the correction has to take place.

The extension of the individual monochromatic sections of the cutting test mark in the feed direction is preferably identical.

The cutting test mark, in particular the respective monochromatic section, preferably has a width extension of at least 5 mm in a transverse direction extending parallel to the cutting plane, by which the acquisition and evaluation of the pattern is facilitated.

It is considered to be particularly advantageous if sections adjacent in the feed direction differ with respect to their arrangement in the transverse direction, insofar as they are arranged offset to one another in the transverse direction. Such an offset is to be considered advantageous in that the areas of different colors in the area of the cut front edge then also have a corresponding offset in the transverse direction, which facilitates the evaluation of the frontal pattern. Moreover, tolerances in the register accuracy of the printed image come into effect less due to such an arrangement staggered in the transverse direction. It is thus entirely conceivable that with narrow strips in the feed direction, for example, in the range of 0.05 mm, and a register accuracy (image variations during printing in the running direction) in the same order of magnitude, the test cut will go once through one and once through the other color strip, which according to experience would result in a mixed color in the cut front side. If there is a laterally different extension of the strips in addition, there is always an unambiguous color assignment.

Such an offset is preferably between 1 mm and 10 mm.

Such an offset of the sections in the transverse direction is preferably approximately identical to the width extension of the respective section. In particular, the sections are arranged like a staircase. It is entirely conceivable that the sections are arranged offset to one another in the transverse direction such that there is no overlap in the transverse direction between the sections. An offset in the transverse direction.

It is considered to be advantageous if adjacent monochromatic sections in the feed direction differ in their transverse extension. In addition to the color difference of the corresponding areas, a difference in the transverse extension thus results in the pattern. The recognition of areas of different color is thus facilitated. This is in particular relevant in that the areas of different color will generally not be sharply separated, but rather will merge into one another due to tolerances. Among other things, the determination of a location of the boundary between the areas of different color is made more difficult by the color transition. In such a case, the geometry of the pattern can be used as a further differentiation criterion.

It is considered to be particularly advantageous if adjacent monochromatic sections directly adjoin one another.

With respect to the monochromatic sections, it is entirely conceivable that they are arranged interleaved with one another, for example, in the form of interleaved, preferably concentric rectangles. An interleaved arrangement of the sections has the advantage that the same cutting test marks can be used both with a longitudinal cut and with a transverse cut, insofar as the same cutting test marks can also be used upon a rotation of the cutting layer by 90°.

In one preferred embodiment, it is provided that to determine whether deviations of the alignment of the cutting layer from an intended alignment are present, the determined coloration is compared to an intended coloration corresponding to the intended alignment of the cutting layer, wherein upon deviation of the coloration from the intended coloration, the alignment of the feed saddle in relation to the cutting plane is changed. The intended coloration is preferably monochromatic. It can be defined, for example, by the color of the cutting test mark of the uppermost sheet, at which the cutting blade cuts the cutting test mark. The intended coloration is preferably stored in a cutting program to be executed by the cutting machine. Carrying out the test cut, thus the cut through the cutting test marks, and the intended location of the test cut are preferably also stored in the cutting program.

Upon the presence of a change of the coloration of the acquired pattern in the stack direction of the cutting layer, a required correction of the tilt angle of the feed saddle is preferably determined.

In this context, it is considered to be particularly advantageous if, to determine the required correction of the tilt angle of the feed saddle in the pattern, a first reference position and a second reference position spaced apart in the stack direction are selected, wherein a color value of the coloration at the first reference position is determined and a color value of the coloration at the second reference position is determined, wherein a distance of the reference positions in the stack direction is determined, wherein the required correction of the tilt angle of the feed saddle is determined from a comparison of the distance of the reference positions in the stack direction to a distance of the positions of the corresponding color values in the cutting test mark in the feed direction. The determination of the required correction is preferably carried out in a computer-assisted manner. The required correction of the tilt angle is preferably calculated, for example, via the formula $$\varphi = \arctan\frac{X(C1) - X(C2)}{Z(C1) - Z(C2)}$$

wherein

φ: required tilt angle correction or angle deviation in the tilt;

Z(C1): position having color value C1 in the stack direction Z;

Z(C2): position having color value C2 in the stack direction Z;

X(C1): position having color value C1 in the feed direction X; and

X(C2): position having color value C2 in the feed direction X.

In this context, it is again considered to be advantageous if the cutting test mark has at least four sections.

The first reference position is preferably in the area of the upper end of the cutting layer and the second reference position is in the area of the lower end of the cutting layer. Since the height of the cutting layer is generally known, the height can then be used in good approximation as the distance of the reference positions, due to which a complex distance measurement can be omitted. The distance of the color values in the cutting test mark is generally known, for example, from the preprint stage.

The determination of the required correction is preferably carried out by a calculation. With a cutting test mark having multiple monochromatic sections of different color arranged one behind another, a required correction of the tilt angle can be determined from the position of the color transitions in the pattern via the geometric relationship of the known distances of the corresponding color transitions in the cutting test mark.

In one preferred embodiment, it is provided that a distance of specific colors in the pattern in the stack direction is determined and compared to a distance of the same colors in the cutting test mark in the feed direction and the required correction of the tilt angle of the feed saddle is determined from the result of the comparison.

It is considered to be advantageous if the respective sheet is provided with a first cutting test mark and an identical second cutting test mark, wherein the first cutting test mark and the second cutting test mark are spaced apart from one another in a transverse direction extending transversely to the feed direction, wherein the cut-through first cutting test marks form a first frontally visible pattern and the cut-through second cutting test marks form a second frontally visible pattern, wherein the coloration of the first frontal pattern is compared to the coloration of the second frontal pattern to determine a possible deviation in the rotational position of the cutting layer or of the printed image from the intended alignment in relation to the cutting plane. It is considered to be particularly advantageous if the required correction of the rotational angle of the feed saddle is determined from the result of the comparison.

It is considered to be particularly advantageous in this context if, to determine the required correction of the rotational angle of the feed saddle at a specific height in the stack direction, a color value of the coloration of the first pattern is determined and a color value of the coloration of the second pattern is determined at the same height in the stack direction as in the first pattern, wherein the required correction of the rotational angle of the feed saddle is determined from a comparison of the distance of the first and the second cutting test marks in the transverse direction with a distance of the positions of the corresponding color values in the cutting test marks in the feed direction, preferably is determined in a computer-assisted manner, in particular is calculated, for example, via the formula $$\theta = \arctan\frac{X(C1) - X(C2)}{D}$$

wherein

θ: required rotational angle correction or angle deviation in the rotation;

X(C1): position having color value C1 in the feed direction X;

X(C2): position having color value C2 in the feed direction X; and

D: distance between the first cutting test mark and the second cutting test mark in the transverse direction Y.

The distance between the first and the second cutting test mark in the transverse direction is generally known, for example, from the preprint stage, so that no distance measurement has to be carried out for this distance. This applies accordingly to the distance of the color values in the cutting test mark in the feed direction. Therefore, a color value measurement or color value determination only has to take place in the patterns. If the cutting test marks have strip-shaped monochromatic sections and these sections have an offset in the transverse direction, this offset additionally has to be taken into consideration. For example, in the calculation according to the above formula, the distance between the first cutting test mark and the second cutting test mark in the transverse direction then does not have to be used, but rather the distance between the corresponding colored section of the first cutting test mark from the corresponding colored section of the second cutting test mark in the transverse direction is used.

In one preferred embodiment, the respective sheet has multiple cutting test marks in the feed direction, which are spaced apart from one another in the feed direction. This makes it possible, for example, to carry out further test cuts in order to check whether the alignment of the cutting layer has changed after carrying out strip cuts or intermediate cuts or the location of the printed image or the sheets has changed in relation to the cutting plane because of other circumstances, and to perform any corrections.

It is conceivable in principle that the determination of the required corrections, for example, the rotational angle and/or tilt angle correction, is carried out via a value table in which colorations are correlated with the corresponding required corrections. Such a value table can be prepared beforehand, for example, by test cuts with known alignment errors. When carrying out the method, the resulting pattern or the coloration of the pattern can then be compared to the comparison patterns having known alignment errors, which are stored in the value table, in order to determine the required corrections.

It is considered to be advantageous if the frontally visible pattern or patterns, in particular the first and the second frontally visible pattern, are acquired by means of at least one image sensor, for example, the image sensor of a camera, and transmitted to an evaluation device, wherein the evaluation device is configured to determine the coloration of the pattern or patterns in a computer-assisted manner and/or to determine the required correction of the rotational angle in a computer-assisted manner and/or to determine the required correction of the tilt angle of the feed saddle in a computer-assisted manner.

It is entirely conceivable in this case that a user interacts with the evaluation device, for example, via a graphic user interface. It is conceivable here that the user judges and defines the position of color transitions or boundaries in the pattern. It is also entirely conceivable, however, that the determination as to whether deviations of the alignment of the cutting layer from an intended alignment are present is carried out fully automatically based on an evaluation of the coloration of the frontally visible pattern.

The image sensor is preferably movable in the stack direction and/or in the transverse direction, thus along the front face, in order to acquire the pattern or patterns.

The evaluation device is preferably configured to compare the acquired coloration to the intended coloration corresponding to the intended alignment and, from the result of the comparison, to determine the required correction of the rotational angle and/or the required correction of the tilt angle of the feed saddle.

In one preferred embodiment, it is provided that the cutting machine has an adjustment device, such as a positioning motor, for adjusting the rotational angle and/or tilt angle of the feed saddle, wherein the evaluation device is configured to cause the adjustment device to perform the required correction of the rotational angle and/or tilt angle of the feed saddle.

The cutting machine according to the invention is used for cutting a cutting layer made up of stacked, sheet-format product in the form of sheets, wherein the respective sheet is provided with at least one cutting test mark. The cutting machine is in particular a guillotine cutter. The cutting machine has a table for receiving the cutting layer, a cutting blade, and a feed saddle for displacing the cutting layer in the direction of a cutting plane of the cutting blade of the cutting machine. The respective cutting test mark has a coloration changing in the feed direction of the feed saddle, wherein the cutting machine has an adjustment device for adjusting an alignment of the feed saddle in relation to the cutting plane, to change an alignment of a cutting layer pressing against the feed saddle in relation to the cutting plane. The cutting machine has a system for determining and correcting any deviations of the alignment of the cutting layer from an intended alignment of the cutting layer, wherein the system has at least one image sensor, wherein the image sensor is configured, after a cut through the cutting test marks, to acquire a frontally visible colored pattern formed by the cut cutting test marks, wherein the system has an evaluation device, wherein the evaluation device is configured to determine on the basis of a coloration of the acquired pattern whether deviations of the alignment of the cutting layer from the intended alignment are present, and wherein the system is configured, if deviations are present, to adjust the feed saddle in its alignment in relation to the cutting plane by activating the adjustment device to correct the alignment of the cutting layer pressing against the feed saddle in relation to the cutting plane.

It is considered to be particularly advantageous if the cutting blade is a longitudinal blade. The cutting machine is preferably a transverse cutter, in particular a guillotine cutter, particularly preferably a high-speed cutter.

The cutting machine is used in particular to carry out the method according to the invention. The cutting machine is preferably configured to carry out the method according to the invention, in particular fully automatically.

In one preferred embodiment, it is provided that the feed saddle is rotatable around a first axis extending perpendicular to a plane spanned by the table to change a rotational angle of the feed saddle with respect to the cutting plane and/or wherein the feed saddle is rotatable around a second axis extending parallel to the plane spanned by the table to change a tilt angle of the feed saddle with respect to the cutting plane.

It is considered to be advantageous if the evaluation device is configured to evaluate the colored pattern acquired by the image sensor in a computer-assisted manner in order to determine the required correction of the tilt angle and/or the required correction of the rotational angle in a computer-assisted manner.

In one refinement, it is provided that the evaluation device is configured to compare the determined coloration to an intended coloration, which is stored in a memory of the evaluation device and corresponds to the intended alignment of the cutting layer, wherein the system is configured to activate the adjustment device based on the result of the comparison to correct the alignment of the cutting layer pressing against the feed saddle in relation to the cutting plane.

It is also entirely conceivable that the evaluation device and/or the image sensor form components of a camera system.

It is entirely conceivable that the evaluation device forms a separate component. The evaluation device can thus be arranged substantially independently from the cutting machine or can be arranged at different points of the cutting machine. It is entirely conceivable that the evaluation device is arranged spatially separate from the cutting machine.

The system preferably has multiple image sensors, wherein the image sensors are configured to optically acquire different areas of the cut front side, in particular to optically acquire areas spaced apart in a transverse direction.

However, it is also entirely conceivable that the system has only one image sensor for optically acquiring the front side, wherein this image sensor is movable in the transverse direction and/or in the vertical direction to optically acquire different areas of the front side. This is advantageous in particular if cutting test marks spaced apart in the transverse direction are formed on the respective sheet. Due to the mobility of the at least one image sensor, independently of the arrangement of the cutting test marks on the sheets or the leaves, the frontal patterns formed by these cutting test marks can therefore be acquired.

It is considered to be particularly advantageous if the at least one image sensor is arranged on the side of the table which is used to receive the cut product. Such an area of the table is often also designated as the front table. The table area arranged on the other side of the cutting plane is typically designated as the rear table.

The at least one image sensor is preferably arranged above the product to be cut or above the table.

It is preferred if the at least one image sensor is mechanically connected to the cutting machine, preferably is mechanically connected to a portal frame of the cutting machine. It is considered to be particularly advantageous in this context if the portal frame is used for mounting the cutting blade.

The advantages and advantageous refinements mentioned in conjunction with the method apply accordingly to the cutting machine and vice versa.

BRIEF DESCRIPTION OF THE DRAWING FIGURES

The invention will be explained in more detail with reference to the following figures on the basis of exemplary embodiments, without being restricted thereto.

DETAILED DESCRIPTION OF EXEMPLARY EMBODIMENTS

Figure 1:
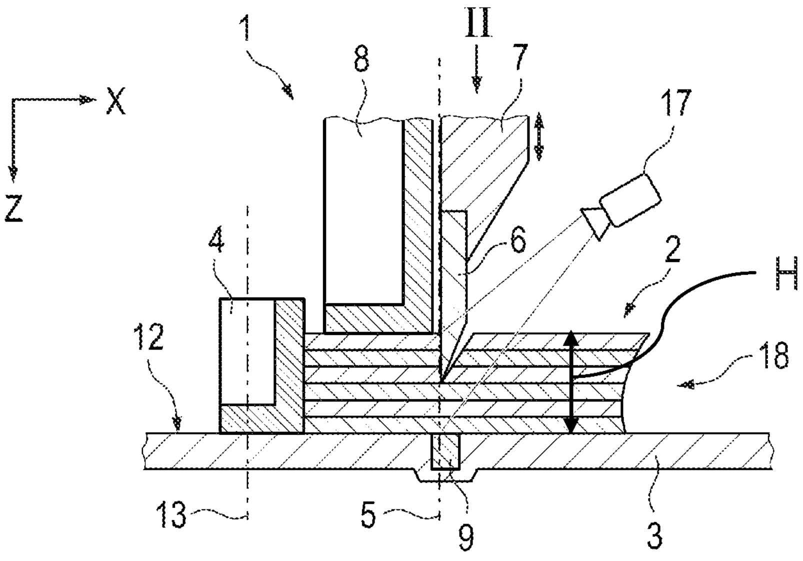
FIG. 1 shows a schematic representation of a cutting machine according to the invention in a sectional view along line I-I in FIG. 2.

FIG. 1 shows a cutting machine 1 according to the invention, which is used to cut a cutting layer 2 of stacked, sheet-format product in the form of sheets. The sheets can be sheets made of paper, paperboard, film, or the like. The cutting layer 2 is present in cuboid form and has a stack height H.

Figure 2:
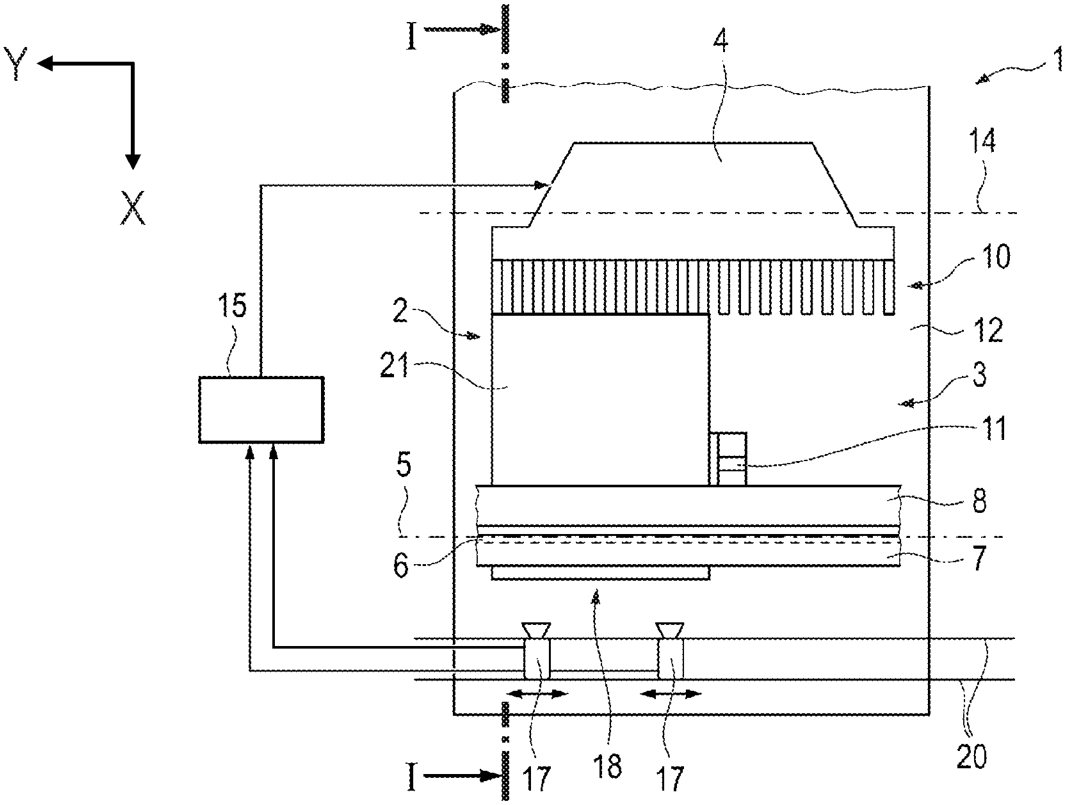
FIG. 2 shows the cutting machine according to the invention in a view according to arrow II in FIG. 1.

The cutting machine 1 has a table 3 having an upper, horizontal table surface 12. In FIG. 2, the table surface 12 extends perpendicular to the plane of the drawing sheet, thus in or parallel to the X-Y plane. A cutting blade 6 that can be lowered and raised is mounted in a portal frame (not shown in more detail), wherein a pressing bar 8 is mounted so it can be raised and lowered, also in the portal frame, in front of the cutting blade 6. The pressing bar 8 is used for fixing the cutting layer 2, in that the pressing bar 8 presses the cutting layer 2 against the table 3 in the lowered position, as shown in FIG. 1. The cutting blade 6 is movable in the swing cut by means of a crank drive (not shown in more detail) from an upper end position into a lower end position, in which it penetrates into a cutting bracket 9 received by the table 3. FIG. 1 shows the cutting blade 6 in a state between the first end position and the second end position. The cutting blade 6 is mounted in the present case in a so-called blade bar 7 of the cutting machine 1, wherein this blade bar 7 is movable from the first end position into the second end position and is used to transfer the cutting movement to the cutting blade 6.

Figure 3:
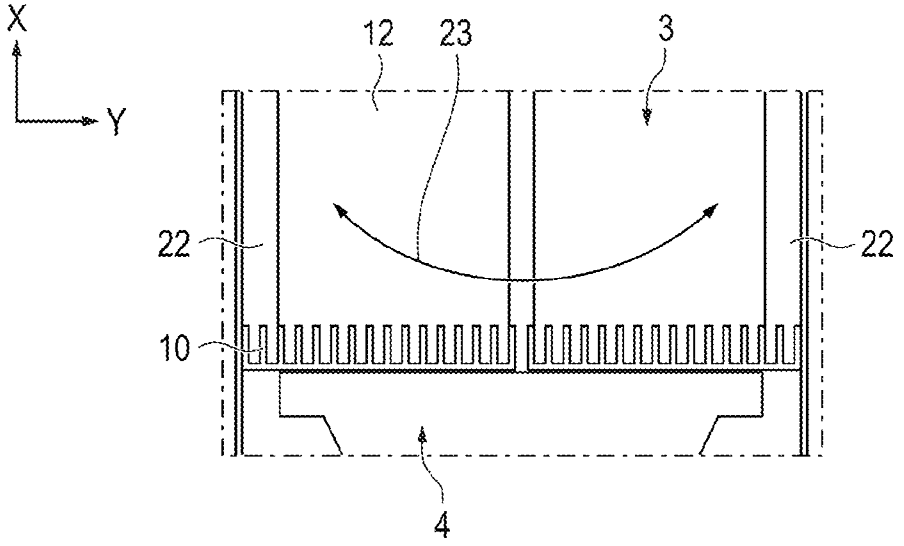
FIG. 3 shows a partial area of the cutting machine according to FIG. 1 in a view from above.
Figure 4:
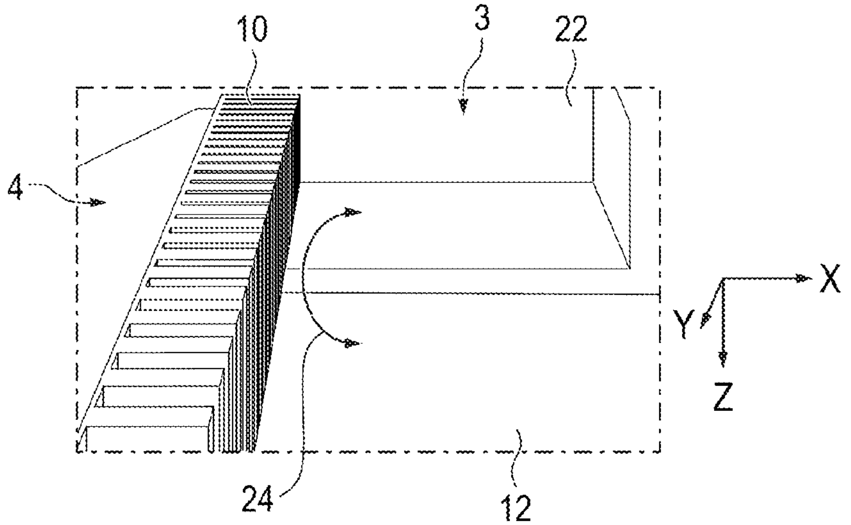
FIG. 4 shows a partial area of the cutting machine according to FIG. 1 in a perspective view diagonally from the side.

In the area of the rear table part, thus on the left in FIG. 1, a feed saddle 4 is provided, which has a front rake section 10. This rake section 10 presses against the cutting layer 2 at the end facing away from the cutting blade 6. The feed saddle 4 is used to displace the cutting layer 2 in the direction of a cutting plane 5 of the cutting blade 6. The cutting plane 5 is in the present case in or parallel to the Y-Z plane. The feed saddle 4 is rotatable around a vertical axis 13 to change an alignment of the cutting layer 2, namely a rotational position of the cutting layer 2, in relation to the cutting plane 5 of the cutting blade 6, as is schematically indicated by the arrow 23 in FIG. 3. Furthermore, the feed saddle 4 is rotatable around a horizontal axis 14 to change an alignment of the cutting layer 2, namely a tilt of the cutting layer 2, in relation to the cutting plane 5 of the cutting blade 6, as is schematically indicated by the arrow 24 in FIG. 4. The cutting machine 1 has an adjustment device (not shown in more detail) for rotating and tilting the feed saddle 4.

The cutting machine 1, more precisely the table 3, has two opposite lateral stops 22, which are used to contact the cutting layer 2. The cutting layer 2 can be manually oriented by means of a straight edge 11, in particular pressed against one of the lateral stops 22.

Figure 5:
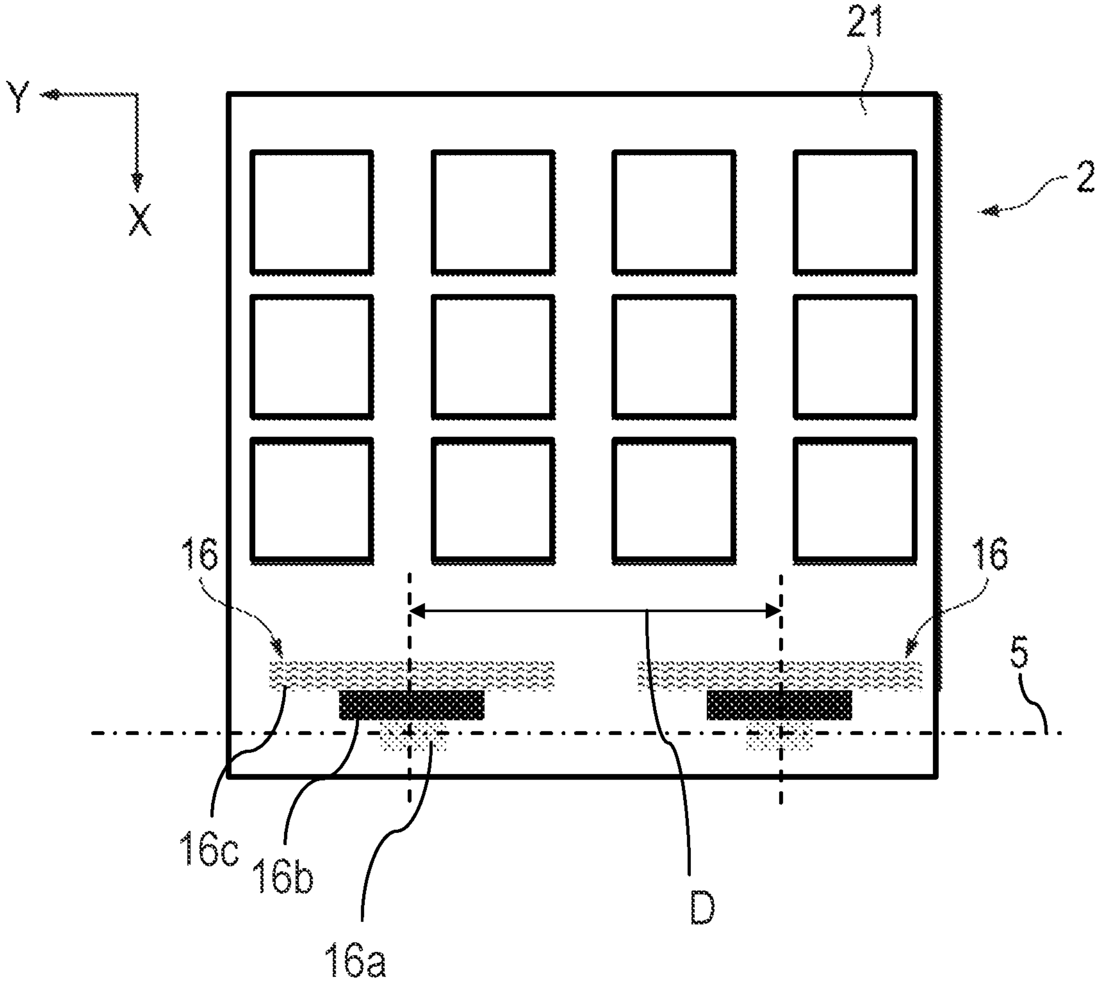
FIG. 5 shows a schematic representation of a sheet to be cut of a cutting layer in a view from above, wherein the sheets are each printed with a cutting test mark according to a first embodiment.

An upper side 21 of a sheet of the cutting layer 2 is shown in FIG. 5. The sheets are printed with a printed image, in the present case in the form of squares, which are to be exposed by corresponding cutting. In order to obtain the desired cutting picture, it has to be ensured that the alignment of the cutting layer 2 in relation to the cutting plane 5 corresponds to an intended alignment. For this purpose, in addition to the actual printed image, two cutting test marks 16 according to a first exemplary embodiment, as schematically shown in FIG. 5, are printed on the respective sheet of the cutting layer 2. These cutting test marks 16 were printed together with the printed image. The extension of the cutting test marks 16 is typically only fractions of millimeters in the longitudinal direction X and several millimeters in the transverse direction Y. In contrast, the uncut sheet typically has an extension of greater than 100 cm in the longitudinal direction X and of greater than 100 cm in the transverse direction Y. For reasons of better comprehension, the cutting test marks 16 are not shown to scale in FIG. 5, but rather greatly enlarged. The two cutting test marks 16 have a distance D in the transverse direction Y. The respective cutting test mark 16 has multiple monochromatic sections 16*a*, 16*b*, 16*c* arranged one behind another in the feed direction X of the feed saddle 4 and adjoining one another, wherein adjacent sections 16*a*, 16*b*, 16*c* differ in their color. In the present case, the first section 16*a* is black, the second section 16*b* is yellow, and the third section 16*c* is red. In each case a cutting test marks 16 having a coloration changing in the feed direction X of the feed saddle 4 thus results, namely from black to yellow to red. The respective section 16*a*, 16*b*, 16*c* is rectangular. The longitudinal extension A of the sections 16*a*, 16*b*, 16*c* in the feed direction X are identical and are fractions of millimeters, in the present case each 0.1 mm. Accordingly, center lines of adjacent sections 16*a*, 16*b*, 16*c* have a distance which is identical to the extension of the sections. Transversely to the feed direction X, namely in the transverse direction Y, the sections 16*a*, 16*b*, 16*c* differ in their extension, therefore in their transverse extension. In the present case, the first section 16*a* has a transverse extension of approximately 1 cm. The transverse extension of the second section 16*b* is approximately twice as large as the transverse extension of the first section 16*a* and the transverse extension of the third section 16*c* is approximately twice as large as the transverse extension of the second section 16*b*. The respective cutting test mark 16 therefore also has, in addition to a coloration changing in the feed direction X of the feed saddle 4, a cross section changing in the feed direction X, wherein the cross section changes in steps in the present case. Any deviations of the alignment of the cutting layer 2 from the intended alignment of the cutting layer 2 can be determined by a test cut through the cutting test marks 16 executed using the cutting machine 1, as will be explained in more detail hereinafter.

The cutting machine 1 has a system for determining and correcting any deviations of the alignment of the cutting layer 2 in relation to the cutting plane 5 from the intended alignment of the cutting layer 2 in relation to the cutting plane 5. The system has two cameras, wherein the respective camera has an image sensor 17 for optically acquiring a cut front side 18 of the cutting layer 2 after carrying out a test cut. The two cameras are displaceable in the transverse direction Y and are connected by means of a bearing structure 20 to the cutting machine 1, in the present case the portal frame.

To determine possible deviations in the alignment of the cutting layer 2 in relation to the cutting plane 5, the cutting layer 2 is displaced by means of the feed saddle 4 in the direction of the cutting plane 5 of the cutting blade 6 such that the cutting plane 5 intersects the cutting test marks 16. This state is schematically shown in FIG. 5. Upon a cut using the cutting blade 6, the cutting layer 2 is cut through in the area of the cutting test marks 16, due to which a cut front side 18 of the cutting layer 2 having two frontally visible colored patterns 19, which are spaced apart in the transverse direction Y by the distance D, formed by the cut cutting test marks 16 is formed. Any deviations in the distance D caused by alignment errors are generally negligible.

The image sensor 17 is configured, after a cut through the cutting test marks 16, also designated as a test cut, to acquire the frontally visible colored pattern 19 formed by the cut cutting test marks 16, wherein the system has an evaluation device 15, wherein the evaluation device 15 is configured to determine on the basis of a coloration of the acquired patterns 19 whether deviations of the alignment of the cutting layer 2 from the intended alignment are present, and wherein the evaluation device 15 is configured, upon the presence of deviations, to adjust the feed saddle 4 in its alignment in relation to the cutting plane 5 by activating the adjustment device, namely to rotate it around the axis 13 and/or around the axis 14, in order to correct the alignment of the cutting layer 2 pressing against the feed saddle 4 in relation to the cutting plane 5 in a suitable manner.

The coloration of the respective pattern 19 is dependent on the position at which the cutting test marks 16 were cut through in the feed direction X. If the cutting test mark 16 is cut through in the area of the first black section 16*a*, in the pattern, a black area 19*a* corresponding to the first section 16*a* results in the pattern 19. Accordingly, upon a cut through the second yellow section 16*b*, a yellow area 19*b* results and upon a cut through the third section 16*c*, a red area 19*c* results in the pattern 19. Upon exact alignment of the cutting layer 2 in relation to the cutting plane 5, the cutting test marks 16 are located flush one over another in the direction of the cutting plane 5. This corresponds to the intended alignment of the cutting layer 2 in relation to the cutting plane 5. If a cut is carried out through the cutting layer 2 in the intended alignment, a monochromatic pattern 19 results, since all cutting test marks 16 were cut through at the same position in the feed direction X. If the black section 16*a* is brought into the cutting plane 5, as shown in FIG. 5, a pattern 19 which only consists of a black area 19*a* accordingly results with intended alignment of the cutting layer 2. An intended coloration corresponding to the intended alignment is thus monochromatic black in the present case.

Exemplary cutting patterns 19 for a cutting layer 2, which consists of a plurality of sheets stacked one on top of another, are schematically shown in FIGS. 6 to 9 for different alignments of the cutting layer 2 in relation to the cutting plane 5. For reasons of clarity, the individual sheets, in general several hundred to several thousand sheets stacked one on top of another, are not shown resolved in FIGS. 6 to 9. The respective sheet corresponds to the sheet shown in FIG. 5 and accordingly has two cutting test marks 16 spaced apart in the transverse direction Y. FIGS. 6 to 9 each show two areas of the front side 18 of the cut cutting layer 2 spaced apart in the transverse direction Y, each of which shows a pattern 19 formed by the cut-through cutting test marks 16.

Figure 6:
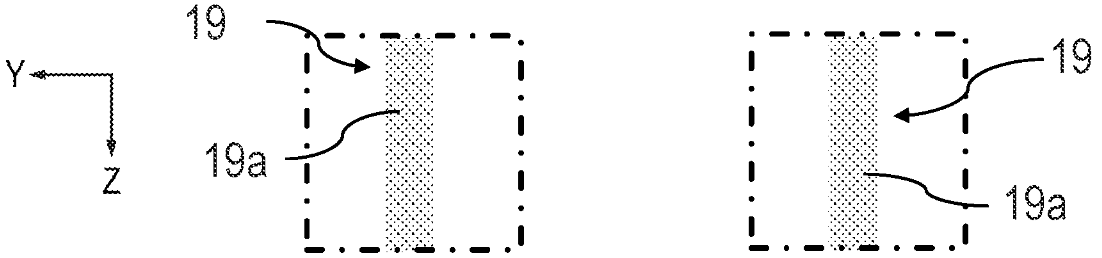
FIG. 6 shows two areas of a cut front side of the product to be cut with intended alignment of the cutting layer.

FIG. 6 shows the result of a cut through a cutting layer 2 in which the alignment of cutting layer 2 in relation to the cutting plane 5 corresponds to the intended alignment of the cutting layer 2 in relation to the cutting plane 5. The alignment of the cutting plane 5 in relation to the cutting test marks 16 in the feed direction X was selected in the test cut such that the cutting blade 6 has cut through the cutting test mark 16 of the uppermost sheet approximately in the middle of the first section 16*a*, as schematically shown in FIG. 5. After the cut, in this case, therefore a case without deviations of the alignment from an intended alignment, the two cut-through cutting test marks 16 form identical frontally visible colored patterns 19, wherein the respective pattern 19 has no color changes or cross-sectional changes in the vertical direction Z, which in the present case is identical to the stack direction of the cutting layer 2. Since the cut has taken place through the first section 16*a*, the coloration of the respective pattern 19 is identical to the color of the first section 16*a*. The respective pattern 19 therefore only has a black area 19*a*. The coloration of the pattern 19 therefore corresponds to the intended coloration.

Figure 7:
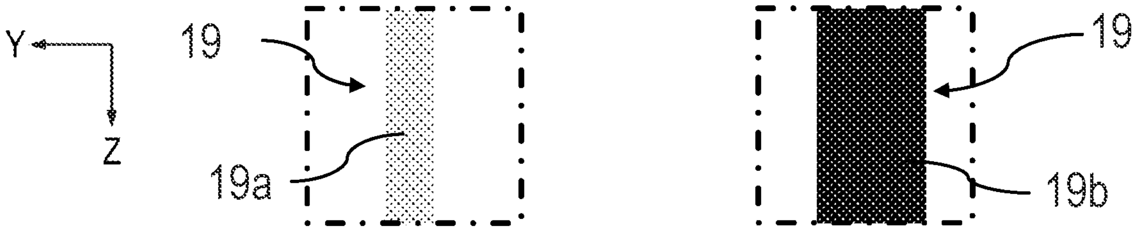
FIG. 7 shows a view as in FIG. 6 with incorrect alignment of the cutting layer with respect to the rotational position.
Figure 8:
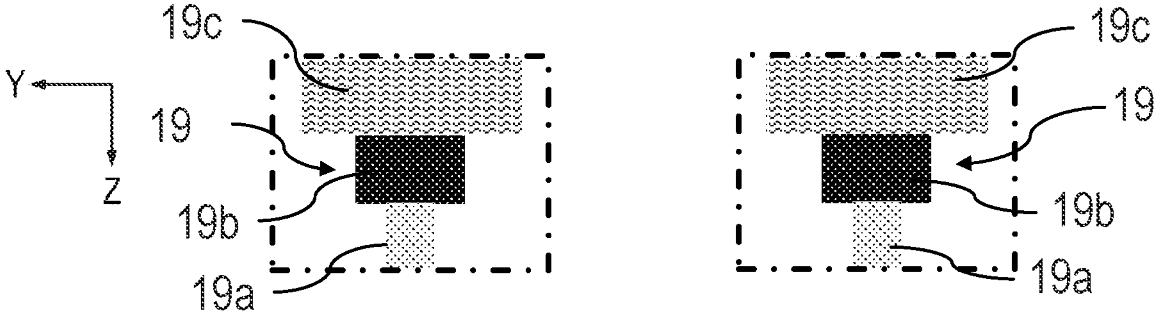
FIG. 8 shows a view as in FIG. 6 with incorrect alignment of the cutting layer with respect to the tilt position.
Figure 9:
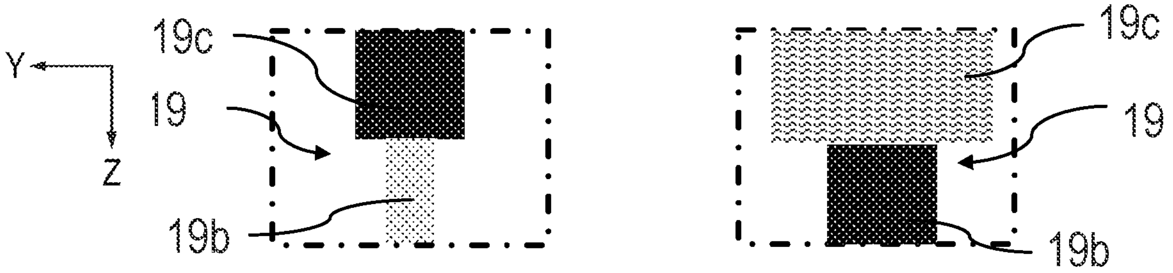
FIG. 9 shows a view as in FIG. 6 with incorrect alignment of the cutting layer with respect to the rotational position and with respect to the tilt position.
Figure 10:
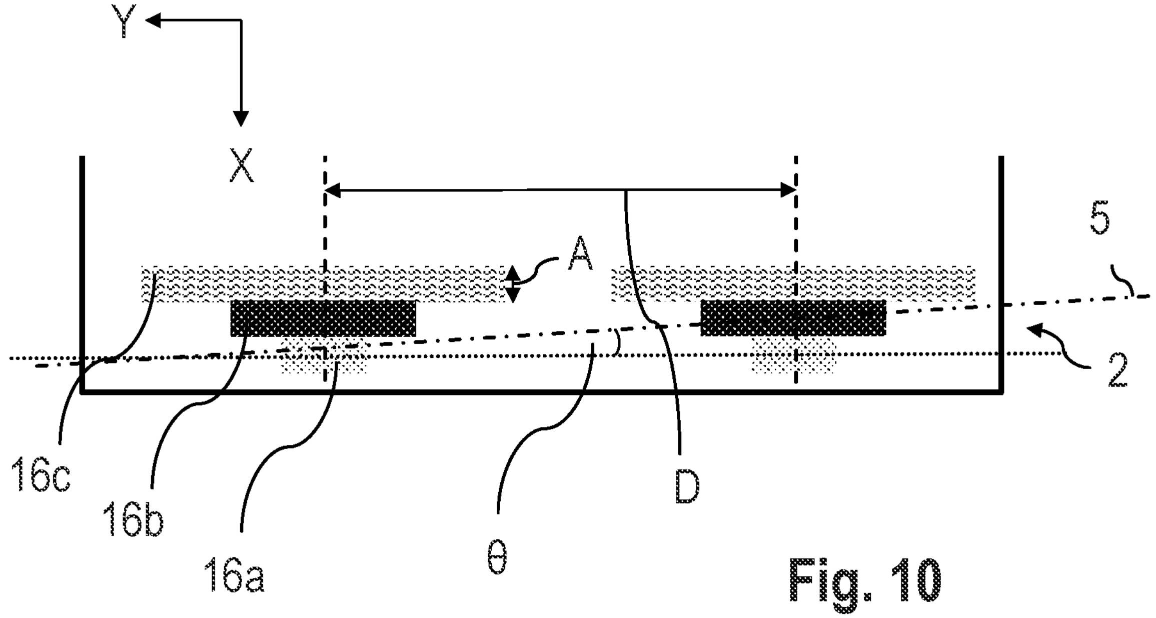
FIG. 10 shows a schematic representation of the cutting layer with an alignment error according to FIG. 7 in a view from above.

FIGS. 7 to 9 show cutting patterns 19 upon deviations from the intended alignment of the cutting layer 2 with respect to the cutting plane 5. FIG. 7 shows an incorrect alignment, wherein this incorrect alignment is that the cutting layer 2 is tilted in relation to the cutting plane 5 with respect to the axis 13 by a rotational angle θ, as schematically shown in FIG. 10. The cutting patterns 19, which are shown in FIG. 7 and are formed by the identical cutting test marks 16, are different in their coloration. The left pattern 19 exclusively has a black area 19*a* and the right pattern 19 exclusively has a yellow area 19*b*. This difference results in that due to the incorrect alignment of the cutting blade 6, the cutting test mark 16 forming the respective pattern 19 has not been cut through in identical sections, but rather the cutting test mark 16 forming the left pattern 19 was cut through in the first black section 16*a* and the cutting test mark 16 forming the right pattern 19 was cut through in the second yellow section 16*b*, as can also be seen from FIG. 10. Moreover, the two patterns 19 differ in their dimension in the transverse direction Y. This difference is because the first section 16*a* has a lesser extension in the transverse direction Y than the second section 16*b*. The correction of the alignment of the cutting layer 2 can be carried out by rotating the feed saddle 4 around the axis 13. Since the two patterns 19 are monochromatic, there is no tilt error. The rotational angle θ and thus the required rotational angle correction can be calculated via the following relationship:

$$\theta = \arctan\frac{X(\text{black}) - X(\text{yellow})}{D} = \frac{A}{D}$$

wherein

θ: required rotational angle correction or angle deviation in the rotation;

X (black): position of the color black in the feed direction X;

X (yellow): position of the color yellow in the feed direction X;

D: distance between the first cutting test mark and the second cutting test mark in the transverse direction Y; and A: longitudinal extension of the sections.

Figure 11:
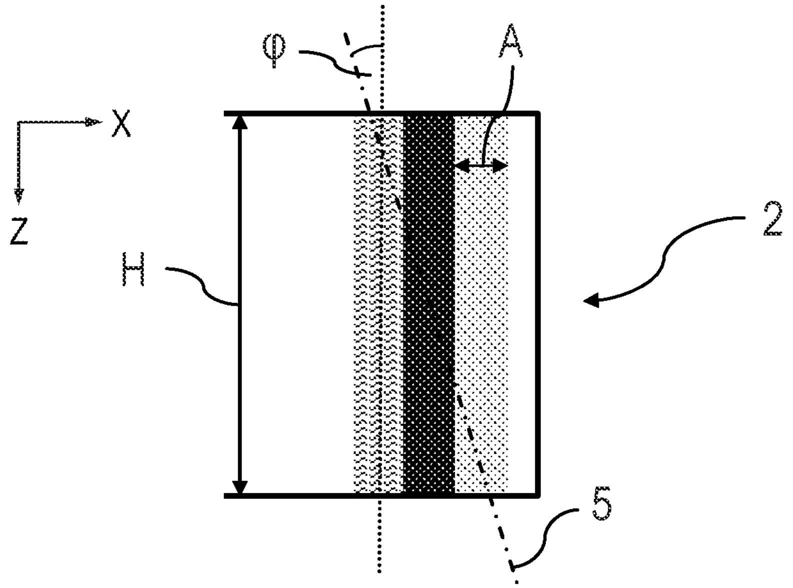
FIG. 11 shows a schematic representation of the cutting layer with an alignment error according to FIG. 8 in a side view.

FIG. 8 shows a different incorrect alignment, wherein this incorrect alignment is that the cutting layer 2 to be cut is tilted in relation to the cutting plane 5 with respect to the axis 14 by the tilt angle φ insofar as is incorrect in its tilt with respect to the cutting plane 5, as schematically shown in FIG. 11. In the present case, the respective pattern 19 has a cross section changing in steps in the vertical direction Z having three steps of different colors, wherein the cross section of the steps increases from bottom to top and the lowermost step is black, the middle step is yellow, and the uppermost step is red. It may be concluded from the coloration of the pattern 19 that the cut cutting layer has a tilt error in the form of an undercut. A correction of the alignment can be carried out by rotating the feed saddle 4 around the axis 14 by the angle φ. Since the two patterns 19 are identical, there is no error in the rotational position of the cutting layer 2. The tilt angle q and therefore the tilt angle correction can be calculated in good approximation via the following relationship:

$$\varphi = \arctan\frac{X(\text{black}-\text{yellow}) - X(\text{yellow}-\text{red})}{Z(\text{black}-\text{yellow}) - Z(\text{yellow}-\text{red})} = \arctan\frac{A}{Z(\text{black}-\text{yellow}) - Z(\text{yellow}-\text{red})}$$

wherein

φ: required tilt angle correction or angle deviation in the tilt;

Z (black-yellow): position of the boundary between the color black and the color yellow in the stack direction Z;

Z (yellow-red): position of the boundary between the color yellow and the color red in the stack direction Z; and A: longitudinal extension of the sections.

In good approximation, it can be assumed that $$\varphi \approx \arctan\frac{(N-1)\times A}{H} = \frac{2\times A}{H}$$

wherein

φ: required tilt angle correction or angle deviation in the tilt;

N: number of the areas of different color in the pattern in the stack direction; in the present case N=3;

A: distance of the centers of adjacent sections in the cutting test mark in the feed direction; and H: stack height of the cutting layer.

FIG. 9 shows the frontal pattern 19 upon the presence of a combination of a tilt error and a rotation error.

Figure 12:
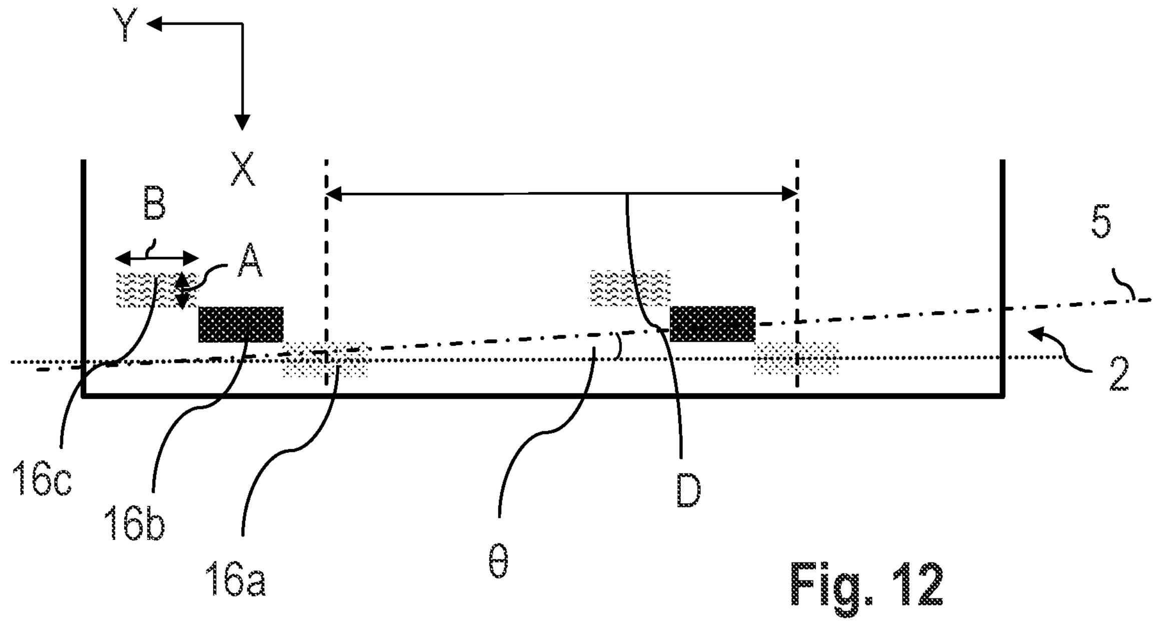
FIG. 12 shows a schematic representation of a sheet to be cut of a cutting layer in a view from above, wherein the sheets are each printed with a cutting test mark according to a second embodiment.

FIG. 12 again shows a schematic representation of a sheet to be cut of a cutting layer 2 in a view from above analogous to FIG. 10 according to a second embodiment. The sheets are again each printed with two cutting test marks 16, wherein the cutting test marks essentially differ from the cutting test marks of the first embodiment shown in FIG. 5 in that the monochromatic sections 16*a*, 16*b*, 16*c* have identical width extension B in the transverse direction Y and are offset in relation to one another by the width extension B in the transverse direction Y, so that a stepped arrangement results.

That which is claimed is:

1. A method for correcting an alignment of a cutting layer made up of stacked, sheet-format product in the form of sheets in relation to a cutting plane of a cutting blade of a cutting machine, wherein the cutting machine has a table for receiving the cutting layer and a feed saddle for displacing the cutting layer in the direction of the cutting plane of the cutting blade of the cutting machine, wherein the feed saddle is adjustable in its alignment in relation to the cutting plane to change the alignment of the cutting layer pressing against the feed saddle in relation to the cutting plane, wherein a respective sheet is provided with at least one cutting test mark, wherein the respective cutting test mark has a coloration changing in a feed direction of the feed saddle, wherein the method comprises:

a) displacing the cutting layer by means of the feed saddle in the direction of the cutting plane of the cutting blade such that the cutting plane intersects the cutting test marks;

b) cutting the cutting layer using the cutting blade to form a cut front side having a frontally visible colored pattern formed by the cut-through cutting test marks;

c) determining a coloration of the frontally visible pattern; and d) determining whether deviations of the alignment of the cutting layer from an intended alignment are present, wherein the determination is carried out on the basis of the coloration of the frontally visible pattern, wherein upon the presence of deviations, the alignment of the feed saddle in relation to the cutting plane is changed to correct the alignment of the cutting layer.

2. The method according to claim 1, wherein the feed saddle is rotatable around a first axis extending perpendicular to a plane spanned by the table to change a rotational angle of the feed saddle with respect to the cutting plane and/or wherein the feed saddle is rotatable around a second axis extending parallel to the plane spanned by the table to change a tilt angle of the feed saddle with respect to the cutting plane.

3. The method according to claim 1, wherein the respective cutting test mark has at least two monochromatic sections arranged one behind the other in the feed direction of the feed saddle, wherein adjacent sections in the feed direction differ in their color.

4. The method according to claim 3, wherein the sections each have an extension of 0.05 mm to 0.2 mm in the feed direction of the feed saddle.

5. The method according to claim 3, wherein adjacent sections in the feed direction are arranged offset in relation to one another in a transverse direction extending transversely to the feed direction.

6. The method according to claim 1, wherein to determine whether deviations of the alignment of the cutting layer from an intended alignment are present, the determined coloration is compared to an intended coloration corresponding to the intended alignment of the cutting layer, wherein upon deviation of the determined coloration from the intended coloration, the alignment of the feed saddle in relation to the cutting plane is changed.

7. The method according to claim 2, wherein upon the presence of a change of the coloration of the pattern in a stack direction of the cutting layer, a required correction of the tilt angle of the feed saddle is determined.

8. The method according to claim 2, wherein the respective sheet is provided with a first cutting test mark and an identical second cutting test mark, wherein the first cutting test mark and the second cutting test mark are spaced apart from one another in a transverse direction extending transversely to the feed direction, wherein the cut-through first cutting test marks form a first frontally visible pattern and the cut-through second cutting test marks form a second frontally visible pattern, wherein the coloration of the first frontally visible pattern is compared to the coloration of the second frontally visible pattern, and the required correction of the rotational angle of the feed saddle is determined from the result of the comparison.

9. The method according to claim 8, wherein to determine the required correction of the rotational angle of the feed saddle at a specific height in a stack direction, a color value of the coloration of the first frontally visible pattern is determined and, at the same height in the stack direction as in the first frontally visible pattern, a color value of the coloration of the second frontally visible pattern is determined, wherein the required correction of the rotational angle of the feed saddle is determined from a comparison of a distance of the first cutting test mark and the second cutting test mark from one another in the transverse direction to a distance of the positions of the corresponding color values in the first and second cutting test marks in the feed direction.

10. The method according to claim 9, wherein the frontally visible pattern or frontally visible patterns are acquired by means of at least one image sensor and are transmitted to an evaluation device, wherein the evaluation device is configured to determine the coloration of the frontally visible pattern or frontally visible patterns in a computer-assisted manner and/or to determine the required correction of the rotational angle of the feed saddle in a computer-assisted manner and/or to determine the required correction of the tilt angle of the feed saddle in a computer-assisted manner.

11. The method according to claim 10, wherein the evaluation device is configured to compare the determined coloration to the intended coloration corresponding to the intended alignment and to determine the required correction of the rotational angle of the feed saddle and/or the required correction of the tilt angle of the feed saddle from the result of the comparison.

12. A cutting machine for cutting a cutting layer made up of stacked, sheet-format product in the form of sheets, wherein a respective sheet is provided with at least one cutting test mark, wherein the cutting machine has a table for receiving the cutting layer, a cutting blade, and a feed saddle for displacing the cutting layer in the direction of a cutting plane of the cutting blade of the cutting machine, wherein a respective cutting test mark has a coloration changing in the feed direction of the feed saddle, wherein the cutting machine has an adjustment device for adjusting an alignment of the feed saddle in relation to the cutting plane, for changing an alignment of the cutting layer pressing against the feed saddle in relation to the cutting plane, wherein the cutting machine has a system for determining and correcting any deviations of the alignment of the cutting layer from an intended alignment of the cutting layer, wherein the system has at least one image sensor, wherein the image sensor is configured, after a cut-through the cutting test marks, to acquire a frontally visible colored pattern formed by the cut cutting test marks, wherein the system has an evaluation device, wherein the evaluation device is configured to determine on the basis of a coloration of the frontally visible colored pattern whether deviations of the alignment of the cutting layer from the intended alignment are present, and wherein the system is configured, upon the presence of deviations, to adjust the feed saddle in its alignment in relation to the cutting plane by activating the adjustment device in order to correct the alignment of the cutting layer pressing against the feed saddle in relation to the cutting plane.

13. The cutting machine according to claim 12, wherein the feed saddle is rotatable around a first axis extending perpendicular to a plane spanned by the table to change a rotational angle of the feed saddle with respect to the cutting plane and/or wherein the feed saddle is rotatable around a second axis extending parallel to the plane spanned by the table to change a tilt angle of the feed saddle with respect to the cutting plane.

14. The cutting machine according to claim 13, wherein the evaluation device is configured to evaluate the frontally visible colored pattern acquired by the image sensor in a computer-assisted manner in order to determine the required correction of the tilt angle of the feed saddle and/or the required correction of the rotational angle of the feed saddle in a computer-assisted manner.

15. The cutting machine according to claim 12, wherein the evaluation device is configured to compare the determined coloration to an intended coloration, which is stored in a memory of the evaluation device and corresponds to the intended alignment of the cutting layer, wherein the system is configured to activate the adjustment device based on the result of the comparison to correct the alignment of the cutting layer pressing against the feed saddle in relation to the cutting plane.

* * * * *